United States Patent [19]

Schaeffer

[11] Patent Number: 5,182,158
[45] Date of Patent: Jan. 26, 1993

[54] LIGHTWEIGHT SANDWICH PANEL

[76] Inventor: Bernarr C. Schaeffer, 129 Lawrenceville Rd., Rosendale, N.Y. 12472

[21] Appl. No.: 478,281

[22] Filed: Feb. 2, 1990

[51] Int. Cl.$^5$ .............................. B32B 3/12; E04C 2/54
[52] U.S. Cl. ........................................ 428/178; 428/72; 428/76; 428/116; 428/118; 428/120; 428/166; 428/170; 428/172; 428/179; 428/182; 428/218; 428/913; 52/785; 52/792; 52/799; 52/806; 52/808; 52/809
[58] Field of Search ............... 428/33, 59, 72, 76, 428/73, 119, 120, 156, 166, 172, 178, 182, 184, 116, 118, 137, 170, 157, 174, 179, 188, 218, 219, 913; 52/785, 806, 808, 792, 809, 799; 181/288, 290

[56] References Cited

U.S. PATENT DOCUMENTS

| | | | |
|---|---|---|---|
| 3,013,641 | 12/1961 | Compton | 428/178 |
| 3,227,598 | 1/1966 | Robb | 428/178 |
| 3,388,522 | 6/1968 | Lowes | 428/178 |
| 3,525,663 | 8/1970 | Hale | 52/792 |
| 3,589,972 | 6/1971 | Grey et al. | 52/792 |
| 3,865,679 | 2/1975 | Hal | 428/178 |
| 3,876,492 | 4/1975 | Schott | 428/178 |
| 3,935,357 | 1/1975 | Padovani | 428/178 |
| 4,348,442 | 9/1982 | Figge | 52/792 |
| 4,461,665 | 7/1984 | Schertler | 428/182 |

Primary Examiner—Donald J. Loney
Attorney, Agent, or Firm—Joseph B. Taphorn

[57] ABSTRACT

A very lightweight sandwich panel is constructed using as the core layer a very thin plastic sheet that has been preformed with projections having broad bonding areas on their free ends for chemically cementing to one outer layer of the panel and with areas between the projections for bonding to the other outer layer. The projections may be made of different cross-sectional shapes, heights, spacings, tilts, profiles, etc., to produce different characteristics in the panel. Differences may even be made in a given sheet to produce a panel having different characteristics in various portions, including shape and function. These characteristics can be predetermined, and the panels may therefore be computer designed. Special panel applications such as airplane wings and thermal boards are comtemplated.

1 Claim, 1 Drawing Sheet

LIGHTWEIGHT SANDWICH PANEL

BACKGROUND OF THE INVENTION

1. Field of the Invention

This invention relates to sandwich panels which are used where strong, stiff, lightweight panels are required, and more particularly to exceedingly lightweight sandwich panels readily formed to different and varying characteristics of rigidity, strength, compressibility, flexibility, profile, shape, size, thickness, weight, etc., and methods of so doing.

2. Description of the Prior Information

Sandwich panels are not new. Basically, they consist of two outer layers interconnected by a core layer. The outer layers may be sheets or slabs of various material such as wood, metals, paper, or plastics. The inner or core layer usually is particle board, plywood, woodstrips, plastic sheeting or a honeycomb structure (see U.S. Pat. Nos. 3,533,894 (Engelbrecht et al), 3,462,330 (Grieg et al); 4,643,933 (Picken) and 4,731,038 (Hancock et al)) of paper or aluminum or plastic to provide lightness while separating the outer layers a distance sufficient to provide the necessary resisting moments for the uses contemplated; the characteristics of a honeycomb panel being controlled not only by core material thickness, but also by density and cell design. The edges of honeycomb or other core structure are secured to the outer layers usually by chemical bonding. Honeycomb edges are narrow and hence the bonding is weak, can be easily pulled apart, and results in many sandwich panel failures. Furthermore, it does not allow for much flexibility in altering the properties of a sandwich panel.

Sandwich panels have also been formed of inner cores involving pulled apart plastics. Such cores are formed by placing a plastic sheet between heated molds of which one is vented on the underside to atmosphere. After the mold is closed and the plastic warmed, the molds are separated a distance equal to the thickness of the finished core. A core having a definetly random cellular structure results.

SUMMARY OF THE INVENTION

Accordingly, it is an object of the invention to provide a sandwich panel that can be readily constructed to have a particular properties.

A further object of the invention is to provide a sandwich panel that can be readily constructed to have varying properties throughout its extent.

A still further object of the invention is to provide a sandwich panel that is very lightweight, yet strong.

It is another object of the invention to provide a sandwich panel construction wherein the desired compressibility, rigidity, flexibility, profile, shape, thickness, weight, etc., can be readily had in a panel.

Yet another object of the invention is the provision of a sandwich panel which can readily be designed through a computer to incorporate specific requirements such as:

1. A particular compression value, or different compression values in various panel portions;
2. A particular flexural value; or different flexural values in various panel portions:
3. A particular static loading value, or different static values in various panel portions; and
4. A particular thickness value, or different thicknesses in various panel portions.

Still another object of the invention is a panel that is simple of construction and easy and inexpensive of manufacture.

The objects of the invention are achieved through the use of a thin core material that is pre-formed with projections or cells that provide relatively large areas for bonding the core layer to the outer layers. The core material is a very thin sheet of plastic, or other material, that is formed, as by thermal/vacuum processes, to provide projections or cells having significant end areas for bonding the core to one outer layer, and sheet areas between the projections for bonding to the other outer layer.

A feature of the invention is that a core sandwich panel can be readily constructed to have different characteristics throughout the panel. Thus, by merely changing the height, the width, the cross-sectional shape, size, slope or spacing of the projections, the panels can be made of different and varying characteristics of rigidity, strength, compressibility, flexibility, profile, shape, size, thickness, weight, etc. Of course, the characteristics of the outside layers affect the panel's properties, too.

All of these specific characteristics can be designed into the sandwich panel of the invention by using a computer to select the:

a. cross-sectional shape of each individual projection or cell;
b. profile of each individual projection as seen from the side;
c. height of each individual projection;
d. spacing of each individual projection;
e. orientation and tilt of each projection;
f. material used for the core layer;
g. material used for the outer layers (skins);
h. thickness of the various layers;
i. bonding agent; and
j. density (spacing) of the individual projections.

Another feature of the invention is that the core sandwich panels can be created of many different plastic materials as well as other materials to fit the panels to may different uses. Thus the outer layers of a panel shaped to be an airplane wing may be of a plastic to accommodate air flow thereover and, along with appropriately projectioned core layer, fuel storage therein. Or an outer layer of panel fabricated to be the outer thermal wall of a house may be of a clear weather resistant plastic while the core layer is of a dark or black plastic with the projections so shaped as to accommodate heat transfer to air being circulated through the panel to transport the heat into the house.

A further feature of the invention is that the core sandwich panels can be made into different shapes such as the aforementioned airplane wings and motor boat hulls providing an extra measure of safety in that not only are they well suited to the function to be performed but also are floatation elements that would keep a downed airplane or punctured boat afloat.

BRIEF DESCRIPTION OF THE DRAWINGS

These and other objects, features, and advantages of the invention will become apparent from a consideration of the following specification when considered with the appended drawings wherein.

DETAILED DESCRIPTION OF PREFERRED EMBODIMENT

Figure 1:
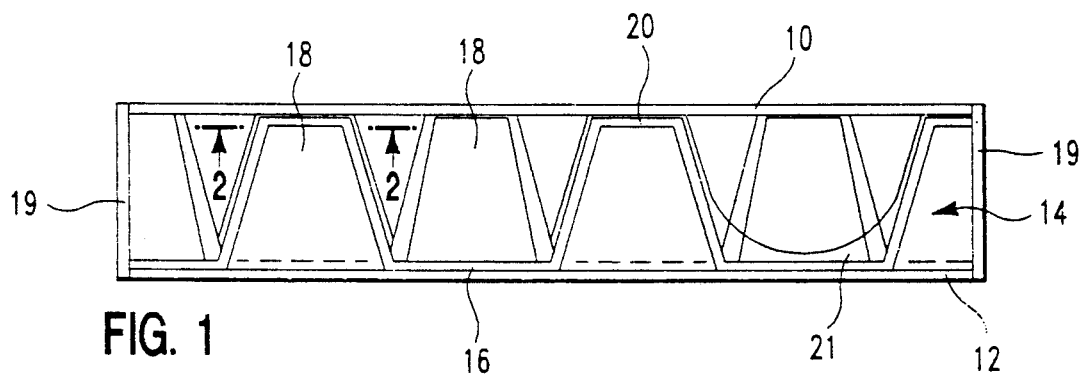
FIG. 1 is an edge view of a sandwich panel constructed according to the invention.

Referring now to FIG. 1 of the drawings, there is shown therein a sandwich panel consisting of an upper layer 10 and a lower layer 12 of suitable face sheets such as polystyrene, aluminum, Formica, Plexiglass, ABS, plywood, Fiberglass, Uvex, PVC, titanium, Mylar, Kydex, Kelvar, graphite, Aramid, boron, vinyl, polyurethane, nitrile rubber, etc. The material chosen will be such as best suits the proposed application. The thickness of the sheets will also be such as best suits the proposed application, and will further involve considerations, of shear and bending moment loads, friction, wear resistance, electrical resistance, static, resistance to weathering and chemicals, etc.

The layers 10 and 12 of the sandwich panel are interconnected by a core layer generally indicated by the number 14. The core layer 14 consists of a very thin sheet of thermoplastic such as polypropylene, polystyrene, Surlyn, polycarbonate, cellulose (CAB), acrylonitrite (ABS), butadiene styrene, acetate butyrate, etc., or other material (such as metal with appropriate zinc content), which has been processed in a thermal/vacuum mold. The mold will have been shaped to provide particular projections of the desired height, shape, spacing, and variation. The sheet itself will be of an appropriate considering the application. The thickness of the sheet likewise will be such as best suits the application, and will further involve, along with the design of the projections, considerations of panel compressibility, rigidity, flexibility, profile and shape, weight, size, etc. While the sheets of different thicknesses may be employed, it will be appreciated that the sheet is relatively thin compared to the eventual thickness of panel so that for a given size a lightweight panel results. It will also be appreciated that sheets of varying thickness may be employed, such as sheets tapered from one end to the other, and that such variation will affect the characteristics of the resulting panel its different portions.

Figure 2:
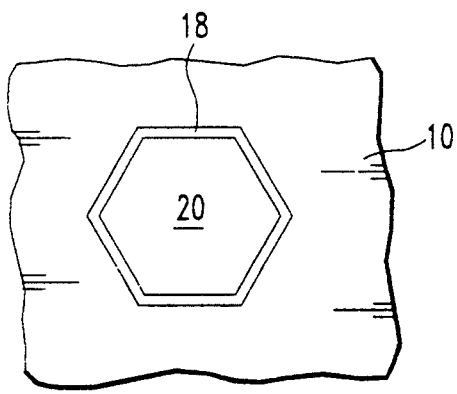
FIG. 2 is a view of the end of a core projection taken along the line 2—2 of FIG. 1.

In FIGS. 1 and 2, the inner core 14 is shown as formed of a sheet 16 having a hexagonal projections 18 in a staggered pattern, the projections 18 of one row being aligned with the interstices of the next row. The upper ends of the projections 18 have flat portions 20 providing wide areas for chemically cementing the core layer 14 to the upper outer layer 10. The sheet 16 element between the projections 18 will provide wide areas for chemically cementing the core layer 14 to the lower outer layer 12. Thus, the core layer 14 is well bonded to the outer layers 10 and 12 to form a secure sandwich panel: the amount of the bonding can be readily varied by varying the size of the projection areas 20 and the space on the sheet 16 between projections.

The resistance to relative movement between the outer layers 10 and 12 can be varied not only by the nature of plastic material of the core 14 and its bonding areas, but also by the tilt, length, cross-sectional shape and spacing of the projections 18. For example, high resistance to compressibility can be obtained by not tilting the side walls of the projections more than 10 degrees from the vertical; compressibility can be increased by changing the tilt to 45 degrees; a tilt of 45 degrees though provides more resistance to lateral shifting of the layers with respect to each other.

Figure 3:
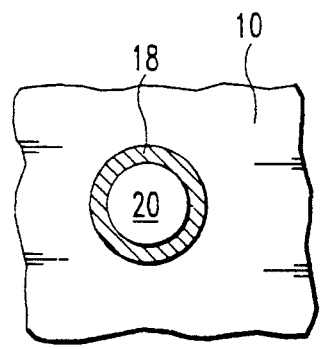
FIG. 3 is a view like that of FIG. 2, showing a core projection having a different cross-sectional shape and bonding area.
Figure 4:
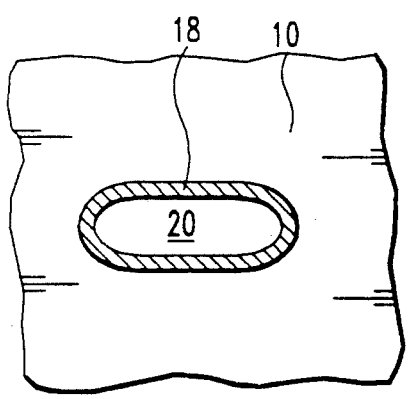
FIG. 4 is a view like that of FIG. 2, showing a projection having an elongated cross-sectional shape and bonding area.

FIGS. 3 and 4 show more alternative cross-sectional shapes to the hexagonal ones of FIG. 2; FIG. 3 shows a circular cross-sectional shape with a reduced bonding area 20; FIG. 4 shows an oblong cross-sectional shape and elongated bonding area 20.

Figure 5:
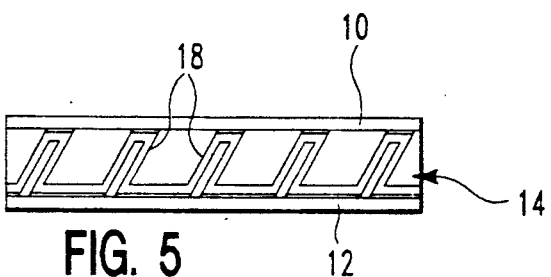
FIG. 5 is an edge view of another sandwich panel constructed according to the invention and showing tilted or inclined projections.

It will be appreciated that the shape of the bonding area 20 of FIG. 4 will make the panel more resistive to bending in the direction parallel thereto. It will also be appreciated that resistance to bending in particular directions can also be varied in other ways as by inclining the projections 18 as is shown in FIG. 5. It will be further appreciated that because of the structural designs that may be incorporated in the projections, that the sandwich panels can be made thinner and yet have the same strengths as thicker ones. It will also be appreciated that because of the strengths possible through the various projection structural designs, the sheet from which the core layer is formed may be of unusual thinness resulting in an exceedingly lightweight panel construction.

Figure 6:
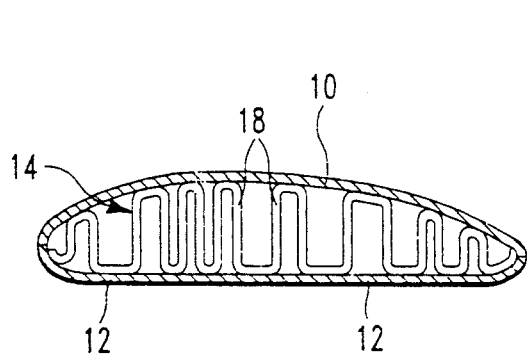
FIG. 6 is a schematic cross-sectional view of an airplane wing showing curved outer panels and a core layer of varying projection.

Sandwich panels according to the invention lend themselves to various shapes, loading and sizes. FIG. 6 schematically depicts a cross-sectional view of a panel constructed to constitute an airplane wing. Therein the upper layer 10 has the lift shape of the upper surface of an airplane wing. The lower layer 12 has a more flat shape to constitute the lower surface of the wing. The inner core 14 is molded with projections of such length as to give the desired profile to the outer layers 10 and 12; of such cross-sectional size and shape and spacing as to provide adequate bonding areas to the outer layers, the necessary wing flexibility and strength, and maximum storage capacity for airplane fuel (it being appreciated that the edges of the outer panels 10 and 12 abut and are sealed by an appropriate cement such as methyl ethyl keytone solvent (MEK)); and of such materials (e.g. polypropylene) as provide the necessary strength and chemical inertness.

Projections 18 may be molded with interconnecting webbing 21 to strengthen the projections 18. Such webbing may also be formed as a channel to form interconnecting passages between the projections or cells 18 for use when the interior of the cells are used for fluid storage or flow.

Panels may be molded to various shapes, even using uniform materials because of the flexibility of the molded core sheet. Thus immediately after the outer and core layers have been assembled with a chemical cement applied to the core layers bonding areas, the assembled panel is placed before the cement sets in a mold providing the desired shape. Then, the bonding areas wetted with cement, slide on the outer layers as the panel conforms to the mold shape. The panel is held in the mold until the cements sets; when removed it will retain the shape it had in the mold, the set cement locking the layers in their adjusted positions.

As suggested earlier herein, sandwich panels according to the invention lend themselves to various applications besides straight incorporation as structured elements. Not only can they be airplane wings, skis, spine boards and stretchers, seats, auto parts, furniture, etc., they can also be thermal boards to be used as walls and roofs on housing. In a thermal board, an outer layer of the panel would be formed of a clear plastic such as acrylic and the inner core layer would be formed of a dark preferably black plastic to absorb the sun's rays and heat up. Air would then be flowed within the panel and around and/or in the projections or cells 18 to heat up and be transported from the top of the panel to the interior of the housing. Of course, outer edges of the panel would need to be closed off, as by strips 19 in FIG. 1.

While the inner core 14 has been described as being manufactured by thermal/vacuum techniques because of its ease and inexpensiveness, it will be realized that other techniques such as injection molding may be utilized to form the desired projections of the inner core 14 of plastic or other materials such as metals incorporating zinc.

It should be evident that applicant has invented an exceedingly lightweight sandwich panel which may be designed to possess varied predetermined characteristics, which lends particular panel design to computer processing. Moreover, it may be constructed of materials selected to produce a panel that may be stiff or rigid in one area and less stiff or rigid in another area of the same panel. Further that the sandwich panel may be designed to have different characteristics in different portions of it. Just varying the shape, profile, orientation and height of each projection will affect the panel in a predictable way, and the panels having the same strengths can be made thinner. Hence panels and different portions thereof can be designed to do whatever is required, and in many different applications. Such applications may include besides normal structural components in housing and other buildings, use in airplane wings, thermal panels, diving boards, spine boards, seats, aircrafts, cycle and auto parts, furniture, material handling, electronic housings, and boat parts especially in view of the floatation characteristics of the panels.

It will also be appreciated that the above described embodiments are merely illustrative of the application of principles of the invention, and that numerous other embodiments may be readily devised by those skilled in the art which will still embody principles or the spirit of the invention. It is intended to protect everything within the scope of the appended claims.

What is claimed is:

1. A sandwich panel comprising outer layers, and a core layer comprising elements bonded to one of the outer layers and having projections bonded to the other outer layer, the projections having relatively flat areas at their free ends to provide broad bonding areas, the flat areas being chemically bonded to the other outer layer, the core layer being a plastic sheet and the projections being formed from the sheet, and the projections per area being varied in density to provide different deflection resistances in various parts of the panel, wherein one of the outer layers is transparent, and the core layer is dark to absorb the sun's ray and open to the passage of air through it.

* * * * *